Jan. 4, 1944.   H. REEDMAN   2,338,203
EXTRUSION MOLDING MACHINE
Filed Nov. 23, 1942   2 Sheets-Sheet 1

INVENTOR
Harry Reedman,
BY
B. B. Collings
ATTORNEY

Jan. 4, 1944.     H. REEDMAN     2,338,203
EXTRUSION MOLDING MACHINE
Filed Nov. 23, 1942     2 Sheets-Sheet 2

INVENTOR
Harry Reedman,
BY
ATTORNEY

Patented Jan. 4, 1944

2,338,203

UNITED STATES PATENT OFFICE 2,338,203

EXTRUSION MOLDING MACHINE

Harry Reedman, Lincoln, England

Application November 23, 1942, Serial No. 466,693
In Great Britain May 16, 1941

9 Claims. (Cl. 25—15)

This invention is for a machine for automatically producing shaped blocks or other bodies by a process of extrusion utilising a moldable material which is adapted to set, and is particularly concerned with the production of molded bodies of concrete. The invention provides an extrusion molding machine, for producing shaped bodies by the extrusion of a moldable material which is adapted to set solid, comprising a chamber for receiving the moldable material, a supply hopper leading to it, and a reciprocating or pulsating impeller for forcing the material through the chamber.

A further feature of the invention consists in the provision of means for incorporating a reinforcement in the material and a still further feature of the invention consists in the provision of a severing device for cutting off lengths of material extruded from the chamber.

In order that the nature of the invention may be more readily understood reference will now be made to the accompanying drawings, wherein.

Figure 1:
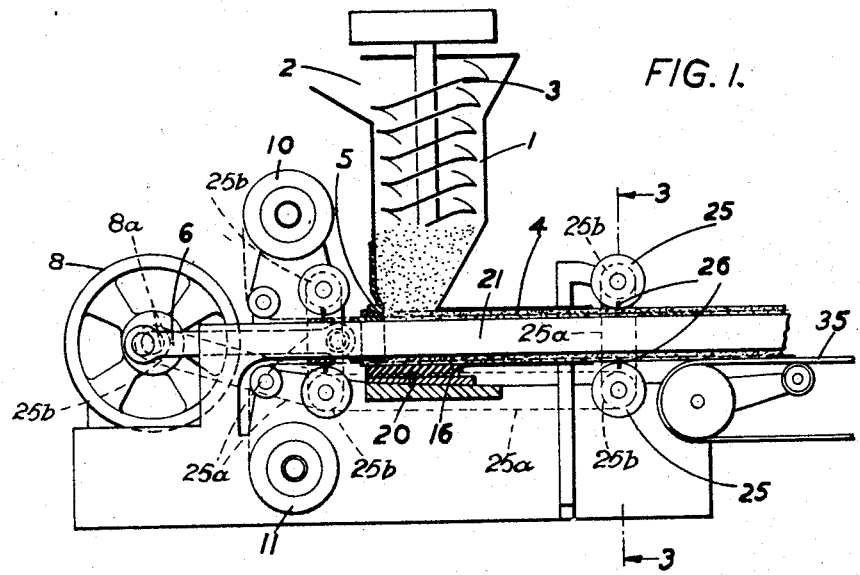
Figure 1 is a fragmental sectional elevation of a machine according to this invention.
Figure 2:
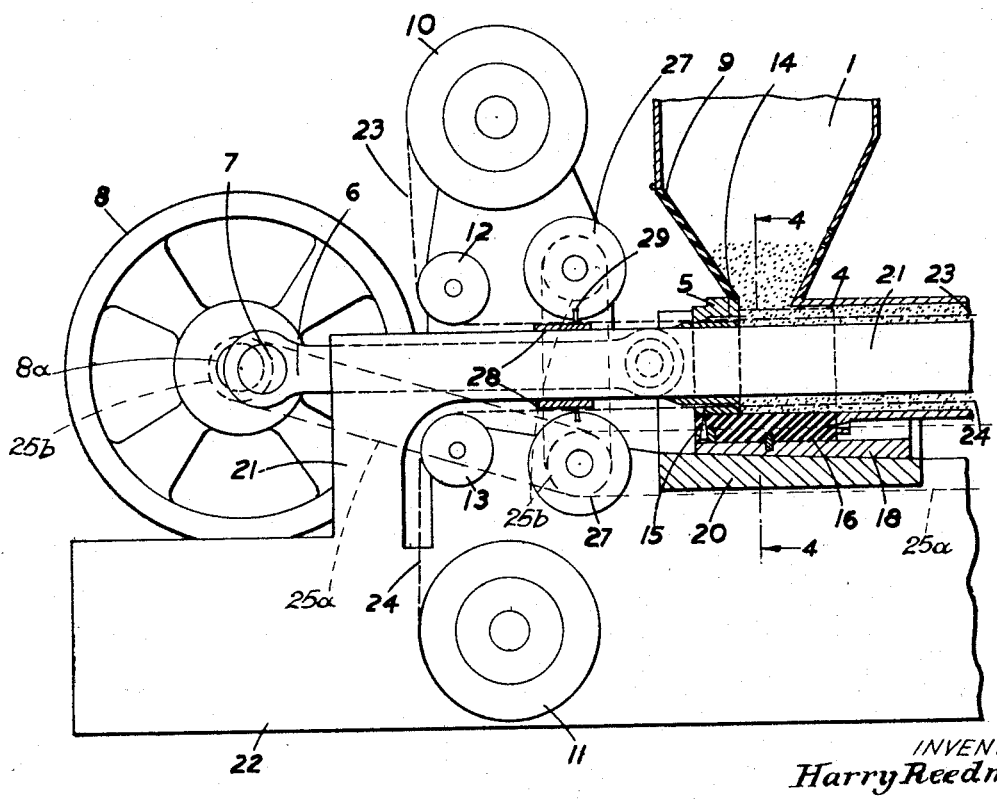
Figure 2 is an enlarged view of a part thereof.
Figure 4:
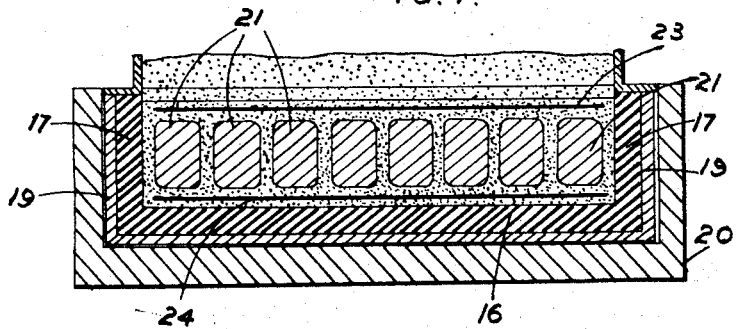
Figure 4 is a fragmental sectional elevation on line 4—4 of Figure 2.

Referring particularly to Figs. 1 and 2, concrete or other material to be molded is fed to a hopper 1 through the opening 2 and inside the hopper an Archimedean screw 3 or other suitable device is provided which feeds the material to the base of the hopper. The base of the hopper communicates with the chamber 4 which functions as a die and the material is pressed into and pushed along such chamber by means of a ram 5 connected by links 6 to a rotating crank 7. The chamber 4 or parts thereof may be removable so that the exterior shape of the molded body may be varied. At each end of the crank shaft there is provided a flywheel 8. The lower rear portion of the hopper is composed of flexible material 9 (armoured rubber sheeting is recommended as being suitable material) and the lower end of the part 9 is connected to the upper part of the ram 5. It thus follows that as the ram is advanced from the rear position shown in Fig. 1 to the forward position shown in Fig. 2 the material at the base of the hopper is compressed and is pushed along the chamber 4. At a short distance beyond the open end of the chamber 4 a conveyor belt 35 is provided for conveying the extruded material to any desired location. 10 and 11 respectively are upper and lower rolls on which are wound reinforcements 23 and 24. Each of these reinforcements may be in the form of bars, or strips but are preferably wire mesh. They may be of metal, glass, hessian or other suitable material and are drawn from the rolls 10 and 11 around jockey pulleys 12, 13 and pass through slots 14 and 15 in the upper and lower part respectively of the ram 5 into the chamber 4 and are embedded in the moldable material to become an integral part of the extruded member. The rearward end of the chamber 4 is preferably of flexible material and in the construction shown, see particularly Figs. 2 and 4, comprises a rubber base 16 with rubber sides 17. The ram 5 is connected to the parts 16 and 17 and the arrangement is preferably such that when the ram is in the most forwardly position as shown in Fig. 2, the parts 16 and 17 are not in tension and as the ram recedes to the position shown in Fig. 1 the parts 16 and 17 are tensioned and stretched. As a result of this stretching, the effective thickness of the parts 16 and 17 necessarily varies, being of the maximum thickness when the ram is in the forward position, Fig. 2, and of the minimum thickness when the ram is in the rearward position, Fig. 1. Alternatively the arrangement may be such that the parts 16, 17 are under no tension (i. e. they are not stretched) when the ram is in the middle of its stroke. In order to compensate for the varying thickness of the parts 16 and 17 and to ensure that the base and sides of the chamber 4 at the rear extremity thereof shall remain of substantially the same internal dimensions throughout, a sliding inclined base plate 18 and two inclined sliding side plates 19 are provided. The plate 18 is connected to the part 16 and the plates 19 are connected to the part 17 or alternatively the plates 18 and 19 are connected to the ram and move in unison therewith. The face of the plates 18, 19 in contact with the parts 16, 17 respectively, lie in planes parallel with the plane containing the axis of movement of the ram but the outer faces of the plates 18 and 19 are inclined so that the plates taper toward their rear end and the inclined faces of the plates slide along similarly inclined faces formed in part of the bed 20. The angle of inclination of these inclined faces is such that the internal dimensions of the chamber constituted in part by the members 16, 17 remain substantially constant.

Figure 5:
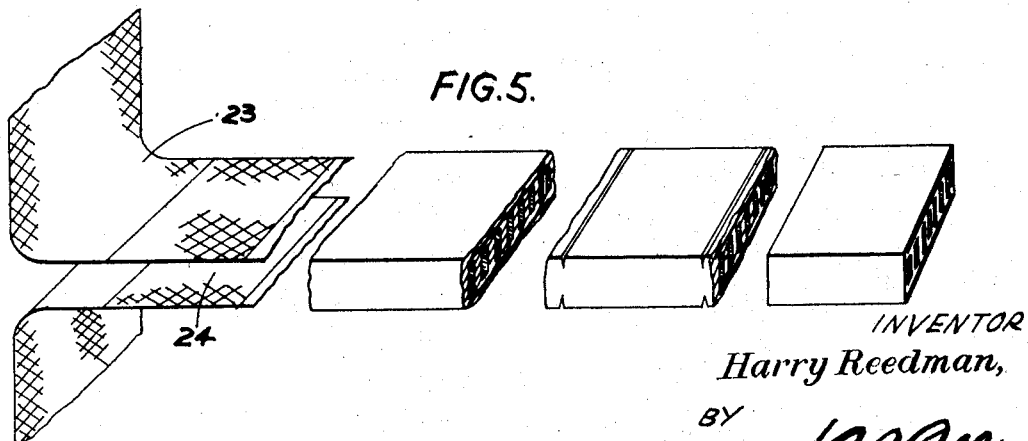
Figure 5 is a perspective view illustrating the steps in the process of manufacture.

A machine in accordance with this invention can be utilised for molding solid articles of any desired shape, but it is particularly suitable for molding substantially hollow articles and in the particular embodiment illustrated there are positioned within the chamber 4 a series of cores 21. These cores may be formed integral with or may be suitably connected to the base plate 22 but are preferably removably connected so that different shaped cores can be employed. In a further alternative the cores are pulsated such as by being connected to and moving with the ram or by being independently actuated such as from a rotating crank. The cores may be solid or hollow members as desired. In the arrangement shown the cores are of elbow shape and extend upwardly from the bed plate 22 and then extend at right angles in a forwardly direction and pass through the ram 5. Each core is of substantially rectangular configuration with rounded corners and the cores are parallel with one another and equally spaced across the width of the chamber 4. There are preferably several connecting links 6 which connect the ram 5 to the crank; there may for example be a link 6 immediately outside the two outside cores 21, and there may be two or three links positioned between selected ones of the other cores. These cores preferably extend to the forward open end of the chamber 4 and the moldable material is consequently forced along the chamber around the cores with the result that the extruded member is of the general shape indicated in Fig. 5. The upper and lower wire reinforcements 23, 24 are, as previously stated, wound on drums 10, 11, respectively, pass around jockey rollers 12 and 13 and then pass through the slots in the ram and lie substantially midway between the upper and lower faces of the cores and the upper and lower inner faces of the chamber 4.

Figure 3:
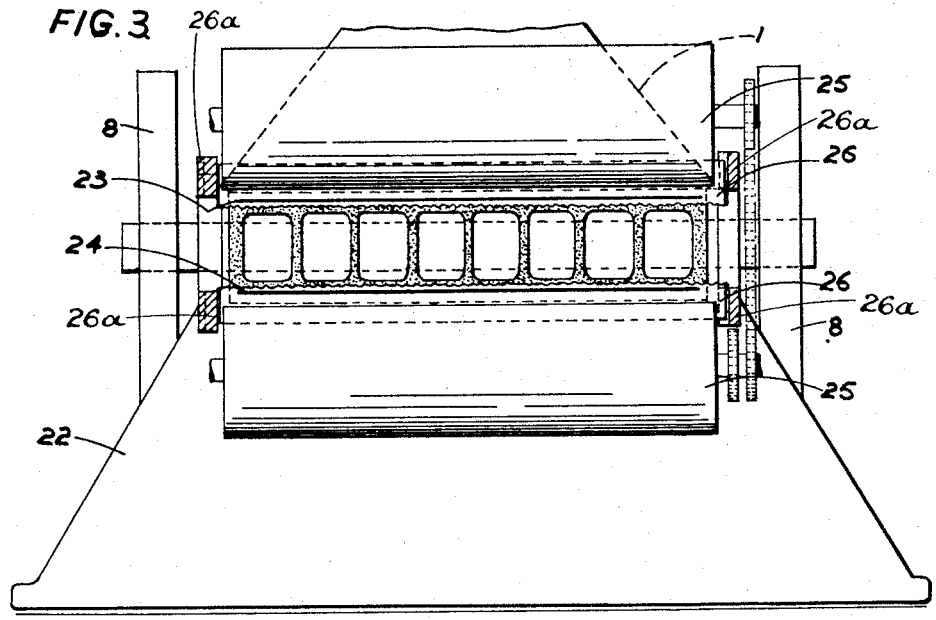
Figure 3 is a fragmental sectional elevation on line 3—3 of Figure 1.

The extruded members may be produced in continuous lengths, but it is preferred that they be severed at intervals and to this end a pair of upper and lower rollers 25 is provided which rollers are situated immediately beyond the open mouth of the chamber 4 and are each provided with knives or cutting members 26. The rollers are driven from any convenient source such as the main shaft 8a by means of connecting chains 25a and sprockets 25b and the arrangement is such that the knife 26 of the upper roller engages the upper face of the extruded member, the knife 26 of the lower roller 25 engages the lower face of the extruded member and such knives penetrate the extruded member and either cut completely through such member or so score the member that it can readily be broken off at a later stage. When it is desired to sever the members into lengths the side faces which are not scored by the rollers are preferably penetrated by a manually operated knife or the like. The knives 26 may be mounted for movement parallel with the axis of their rollers and in one particular construction a cam 26a (Fig. 3) is provided at the end of each roller so that at the time the knives are in contact with the surface of the extruded members the knives are actuated by the cam to move in the direction of the axis of their rollers. By these means a saw action is imparted to the knives and the working edges of the knives may be serrated. By suitable disposition of the cams there may be imparted to the knives short backwards and forwards movements during the time that they are in contact with the upper and lower faces of the extruded members. The rollers may be rotated intermittently and may be stationary whilst the knives are reciprocated. To facilitate the severance of the extruded members into lengths the wire reinforcements may be scored prior to being fed into the chamber 4 and for this purpose two rollers 27, one upper and one lower, are provided and are positioned between the rollers 12, 13 and the ram 5. The wire reinforcements 23, 24 pass over metal blocks, preferably hard steel 28, and knives 29 or other suitable projections on the rollers 27 engage the reinforcements as they pass over the blocks 28 and thereby score them at intervals. The arrangement is such that the rollers 25 and 27 rotate in unison by means such as the aforesaid chains 25a and sprockets 25b so that the knives of the rollers 25 cut the extruded member at the positions where the wire reinforcements have previously been scored by the rollers 27. For this purpose the rollers 25 and 27 are rotated in timed relationship. After leaving the rollers 25 the extruded member is formed into slabs by being severed (such as by hand) along the lines of the cuts formed by the the aforesaid knives.

When using a machine in accordance with this invention for the manufacture of molded concrete articles a suggested suitable mix for the concrete is as follows:

| | |
|---|---|
| Portland cement | parts by volume 1 |
| Fine washed sand | do 2 |
| Slag or granite to pass $\tfrac{3}{8}''$ ring | do 4 |
| Water | per cent by weight 7 |

The type of mix used will of course be determined in some measure by the nature and function of the articles to be produced and the above suggested mix is given merely by way of example and the invention is in no way limited to the use thereof. The pressure exerted by the ram will also depend on the nature of the mix and the article to be produced but when producing articles of the type illustrated by the employment of the above-mentioned mix a suitable pressure for the ram is in the region of 120 lbs. per square inch. The water content in the above example of mix is comparatively low, that is to say the mix in the hopper is comparatively dry and complete hydration of the extruded members is preferably effected by the use of steam autoclaves. For this purpose the extruded members, preferably after being severed, are carried by the conveyor 35 to the steam autoclave where they are stored until hydration is completed, or the process may be a continuous process and in this event the conveyor with extruded members thereon passes through a steam chamber. In lieu of passing the extruded members into an autoclave or through a steam chamber they may be sprayed with water or may be otherwise hydrated after the extrusion process. It will be appreciated, of course, that the length of the chamber 4 must be such that the extruded members are set sufficiently to retain their shape as they leave the open mouth of such chamber.

I claim:

1. An extrusion-molding machine for producing shaped bodies by the extrusion of a moldable material which is adapted to set solid, comprising a chamber for receiving the moldable material, and a supply hopper leading to it, the lower rear portion of said hopper being constituted by a flexible part connecting to a reciprocating impeller, for forcing the material through the chamber.

2. A machine according to claim 1 in which the flexible member is constituted by an armoured rubber sheet.

3. An extrusion-molding machine for producing shaped bodies by the extrusion of a moldable material which is adapted to set solid, comprising a chamber for receiving the moldable material, a supply hopper leading to it, and a reciprocating impeller for forcing the material through the chamber, the base and sides of the chamber at the location where the impeller reciprocates being flexible and connected to the impeller.

4. A machine according to claim 3 in which the said base and sides are constituted by a rubber or rubber compound.

5. A machine according to claim 3 in which means are provided for maintaining constant the internal cross-sectional area of that part of the chamber constituted by the flexible base and sides.

6. A machine according to claim 3 in which there is associated with the said base and each of the said sides an inclined plate which moves in unison with the impeller for maintaining constant the internal cross-sectional area of that part of the chamber constituted by the flexible base and sides.

7. In an extrusion molding machine for producing shaped bodies by the extrusion of a moldable settable material, having a chamber for receiving said material, a member for forcing the material through said chamber, and means for feeding a metal reinforcing element to the chamber for incorporation into the molded bodies; the combination of means for scoring said element prior to its entry into the chamber; and means for severing the extruded material at positions corresponding to the scorings in said reinforcing element.

8. An extrusion molding machine according to claim 7, wherein the scoring means comprise a knife mounted on a rotatable roller positioned to the rear of the chamber, and the severing means comprise knives carried by rotatable rollers positioned adjacent opposed faces of the extruded material beyond the discharge port of the chamber; and means for rotating all of said rollers in timed relationship.

9. An extrusion molding machine according to claim 7, wherein the severing means include a knife carried by a rotatable roller disposed adjacent the discharge port of the chamber; and means for reciprocating said knife longitudinally thereof while performing the severing operation.

HARRY REEDMAN.